United States Patent [19]

Rudin

[11] Patent Number: 5,147,241
[45] Date of Patent: Sep. 15, 1992

[54] MULTIPIECE POULTRY WING RECEIVING WHEEL AND METHOD

[75] Inventor: Kenneth A. Rudin, Canton, Ga.

[73] Assignee: Meyn USA, Inc., Gainesville, Ga.

[21] Appl. No.: 692,377

[22] Filed: Apr. 26, 1991

[51] Int. Cl.5 ............................................ A22C 21/00
[52] U.S. Cl. ..................................... 452/169; 452/154
[58] Field of Search ......................... 452/169, 166, 154

[56] References Cited

U.S. PATENT DOCUMENTS

| 4,207,653 | 6/1980 | Gasbarro | 452/169 |
| 4,577,368 | 3/1986 | Hazenbroek | 452/169 |
| 4,769,872 | 9/1988 | Hazenbroek et al. | 452/136 |
| 4,896,399 | 1/1990 | Hazenbroek | 452/157 |

FOREIGN PATENT DOCUMENTS 8400162  8/1985  Netherlands ......................... 452/169

Primary Examiner—Willis Little
Attorney, Agent, or Firm—Dority & Manning

[57] ABSTRACT

A poultry wing receiving wheel is formed in three separable wheel segments, each of which have peripheral teeth which are aligned when such three segments are assembled so as to collectively form a plurality of circumferentially spaced poultry wing receiving troughs. By separably assembling the three wheel segments, fabrication is simplified and replacement costs are greatly reduced by permitting replacement of only the wheel segment which has worn or damaged peripheral teeth, i.e., the assembled wheel is to a degree rendered repairable. The assembled wheel may be uaed with a conventional apparatus for cutting apart poultry wings. The central most of the three wheel segments may be provided with an integral keyway for mounting on a drive shaft of such a conventional poultry wing cutting machine, with the two remaining segments axially aligned and bolted to such middle wheel segment on each axial side thereof. Antibacterial compounds such as RTV silicon may be applie between the wheel segments and stainless steel bolts may be used to reversibly assemble the wheel segments comprising manmade materials such as thermoplastics, for example nylon.

39 Claims, 5 Drawing Sheets

MULTIPIECE POULTRY WING RECEIVING WHEEL AND METHOD

BACKGROUND OF THE INVENTION

The present invention generally concerns an improved poultry wing receiving wheel and more particularly concerns a multipiece replacement wheel assembly and corresponding method, for use in connection with an apparatus having cutting blades and guide members and used for cutting apart poultry wings.

Poultry processing is an industry which has incorporated mechanization to a considerable degree. Various functions corresponding to different phases of processing poultry are readily automated, subject to accounting for variations in different sizes of poultry specimens. Overall efficiency of a processing line depends on the successful operation of each station or processing phase. One processing phase of present concern relates to a conventional apparatus or machine for cutting apart poultry wings.

As is well known in the poultry processing industry, the wing of a chicken extends from the body of the chicken in jointed sections. Specifically, there are three sections of a chicken which, in order as they extend from the body of the chicken, are referred to as the drummette, the middle section, and the flipper (or tip). The drummette and middle section are joined at what is known as the elbow joint, while the middle section and flipper are joined by what is known as the flipper joint.

Conventional wing cutting apparatus makes use of a rotatable wheel which has a plurality of circumferentially spaced lateral troughs therearound, in which poultry wings are received and presented for being cut into respective sections at the aforementioned elbow and flipper joints. Specifically, typical wheels associated with such conventional wing cutting apparatus have a pair of annular slots into which cutting blades or guide bars or members from the wing cutting apparatus may be inserted. With a poultry wing received in one of the circumferentially located lateral troughs such that the elbow joint and flipper joint of such wing align respectively with the two annular slots of such wheel, the apparatus may be used to draw knife blades through such slots so as to sever or cut apart the wing at the respective joints. Resilient or in some cases fixed guide members may also be drawn into such annular slots so as to force the poultry wings into proper orientation or to otherwise secure such poultry wings for cutting thereof.

Gasbarro (U.S. Patent No. 4,207,653) and Hazenbroek (U.S. Patent No. 4,577,368) disclose two examples of such conventional automatic wing cutting apparatus, including conventional poultry wing receiving wheels respectively mounted therein for receiving poultry wings and being rotatably driven during operation of such apparatus. Such conventional wheels are generally mostly of one piece construction and may comprise synthetic or manmade materials such as thermoplastics, for example, nylon. The disclosure of such two U.S. patents (Gasbarro '653 and Hazenbroek '368) are both fully incorporated herein by reference, including all aspects of the conventional wing cutting apparatus themselves, as well as the conventional poultry wing receiving wheels described therein and their operational and functional relationship with respect to the remainder of such apparatus.

As well illustrated in the poultry wing receiving wheel cross-sectional views of such respective patents (FIG. 5 of Gasbarro '653 and FIGS. 3-5 of Hazenbroek '368), the wing receiving wheels are for the most part generally of one piece construction. However, formation of a plurality of annular slots in addition to a plurality of circumferentially spaced wing receiving troughs in a one piece construction results in a complex fabrication problem. Moreover, the lateral troughs, through one aspect or another of the overall constructions of the cited references, provide and establish a predetermined wing receiving profile including a relative trough peak or ridge for one poultry wing joint (for example, the elbow joint) while simultaneously providing a relative trough valley for receipt of and association with the other poultry wing joint (for example, primarily the flipper joint). The resulting fabrication difficulty is compounded by the fact that the workpiece material (for example, a thermoplastic such as nylon) is in general not repairable. In other words, if an error is made or damage to the overall wheel results during its fabrication, the entire workpiece must be scrapped.

Still an even greater problem arising from use of such mostly one piece wheels is occasioned by the normal expected wear (and even the normal expected damage) which occurs to particular elements of the wheel during its use. For example, after perhaps several months of normal use, the peripheral teeth (in one or more spots) may become worn on the wheel, which situation requires that the entire one piece wheel be replaced in order to correct such excessive wear on even one small facet or part of the workpiece. Without such correction, poultry wings can be mishandled, misfed, or miscut, thereby diminishing efficiency of such processing phase and ultimately having an adverse impact on an entire poultry processing line.

Also, the prospect of damage to the wheel (such as one or more of the peripheral teeth breaking out during use) is another not uncommon occurrence and is clearly another potential area for difficulty. Yet, a one piece wheel arrangement (though relatively difficult to fabricate and generally impossible to repair) offers desired stability during handling of a plurality of chicken wings (particularly as adequate forces are being brought to bear so as to cut apart such wings).

Given the food processing nature of such prior art apparatus, it is also a practical matter that one should constantly consider and address issues of sanitation. In other words, any aspect or feature of the conventional wheel cutting apparatus which involves handling of or cutting the poultry wings requires an accommodation of necessary sanitation measures. The poultry wing receiving wheel is one such feature on conventional wing cutting apparatus.

SUMMARY OF THE INVENTION

The present invention recognizes and addresses various of the foregoing aspects, problems, and others concerning poultry wing receiving wheels for use with automatic wing cutting apparatus. Thus, broadly speaking, a principal object of this invention is to provide an improved wing receiving wheel for such operations. More particularly, a main object is to provide a multipiece replacement poultry wing receiving wheel assembly and corresponding method.

It is another present object to provide a multipiece wheel assembly which is more readily and inexpensively manufactured than conventional single piece wheels. It is a more particular object to provide such a wheel assembly which is repairable upon damage or wear to any portion thereof, without requiring replacement of an entire single piece construction wheel.

It is another general object of the present invention to provide apparatus and corresponding method for an improved and repairable rotatable wheel device for use with a poultry wing cutting machine, which wheel device may also be adequately sanitized for use in a food processing environment.

Still a further more particular object is to provide an improved wheel assembly comprising separably joined wheel segments, which wheel assembly may be used as a multipiece replacement poultry wing receiving wheel in place of the conventional generally single piece wing receiving wheel of a conventional poultry wing cutting apparatus having cutting blades and guide elements received in annular slots of such wheel. It is a further more particular object to provide such an improved multipiece replacement wheel which may be readily partially disassembled to facilitate replacement of respective wheel segments thereof when damaged or worn, without requiring replacement of the entire replacement wheel.

It is another present object to provide corresponding methodology relating to providing and using the presently disclosed multipiece, repairable wheel assembly.

Additional objects and advantages of the invention are set forth, or will be apparent to those of ordinary skill in the art, from the detailed description which follows. Also, it should be appreciated that modifications and variations to the specifically illustrated and discussed features and steps hereof may be practiced in various embodiments and uses of this invention without departing from the spirit and scope thereof, by virtue of present reference thereto. Such variations may include, but are not limited to, substitution of equivalent means, features, materials, or steps for those shown or discussed, and the functional or positional reversal of various parts, features, or steps, or the like.

Still further, it is to be understood that different embodiments as well as different presently preferred embodiments, of this invention my include various combinations or configurations of presently disclosed features or steps, or their equivalents (including combinations of features or steps or configurations thereof not expressly shown or stated).

One exemplary such embodiment of the present invention relates to a wheel assembly for use with a poultry wing cutting machine. Such wheel assembly comprises plural generally planar elements including respective planar elements each with a toothed periphery and respective planar elements each with an annular periphery. Such arrangement also further includes securement means for removably securing such planar elements in predetermined alignment about a common rotatable axis, such that the respective planar elements each with an annular periphery respectively form cutting blade receiving annular slots in such wheel assembly generally perpendicular to its common rotatable axis. Also, the planar elements are removably secured such that the respective planar elements each with a toothed periphery collectively form a plurality of circumferentially spaced poultry wing receiving troughs generally parallel to such common rotatable axis. With such an arrangement, the respective planar elements may be replaced through operation of the securement means as damage or wear occurs to such elements.

Another present exemplary embodiment concerns a multipiece, repairable rotatable wheel device for use with an apparatus having cutting blades and guide members and used for cutting apart poultry wings. Such wheel device includes a plurality of respective wheel segments assembled about a common drive axis to form such wheel device, with at least first and second recessed annular regions formed thereby so as to define respective first and second annular slots in such assembled wheel device for receipt of apparatus cutting blades and guide members therein. Additionally, a plurality of teeth elements of predetermined shape are formed about the periphery of each of the respective wheel segments. Such segments are collectively rotatable about a common drive axis thereof in fixed relative alignment such that the teeth form a plurality of circumferentially spaced lateral troughs for receiving poultry wings therein to be cut apart with apparatus cutting blades received in one or more of the annular slots.

In the foregoing arrangement, the wheel segments preferably are separably assembled so that respective wheel segments of an assembled wheel device may be replaced as teeth thereof become worn or broken, without requiring replacement of the entire assembled wheel device. In such manner, the wheel device is advantageously rendered multipiece and repairable.

Yet another construction comprising a present exemplary embodiment includes a multipiece replacement poultry wing receiving wheel for a poultry wing cutting apparatus having cutting blades and guide bars, such multipiece replacement wheel comprising first, second, and third respective wheel segments, and reversible wheel assembly means for reversibly securing such first, second, and third wheel segments together in fixed axial and circumferential alignment about a common rotatable axis.

In the foregoing arrangement, the first wheel segment preferably has one annular region with a first outside diameter and comprised of circumferentially spaced first wheel segment teeth of predetermined shape situated about the periphery of the first wheel segment, and has another annular region comprising a first annular boss of predetermined thickness and of a second outside diameter smaller than that of the first outside diameter.

Still further, the foregoing exemplary second wheel segment preferably has an annular region with an outside diameter matching that of the first outside diameter, and including circumferentially spaced second wheel segment teeth of predetermined shape situated about the periphery of the second wheel segment. Such teeth are reduced on one axial side of the second wheel segment to a third outside diameter less than that of the first outside diameter but greater than that of the second outside diameter.

Still further, the aforementioned exemplary third wheel segment has one annular region with an outside diameter matching that of the third outside diameter and comprised of circumferentially spaced third wheel segment teeth of predetermined shape situated about the periphery of the third wheel segment. Still further, such third wheel segment has another annular region comprising a second annular boss of predetermined thickness and of a fourth outside diameter smaller than that of the second outside diameter.

The reversible wheel assembly means reversibly secures such three wheel segments together such that the first and second annular bosses define respective first and second annular slots of different depths in the multipiece replacement wheel for receiving cutting blades and guide bars of a poultry wing cutting apparatus. Moreover, the respective teeth of the wheel segments are aligned for forming a plurality of circumferentially spaced lateral troughs therebetween for receiving poultry wings to be cut, while the respective wheel segments are individually replaceable when damaged or worn without requiring replacement of the entire wheel.

The present invention equally concerns corresponding methodology for the apparatus disclosed herewith. For example, one present methodology so corresponding with the disclosed apparatus relates to a method of forming a wheel assembly for use with a poultry wing cutting machine. Such method comprises providing plural generally planar elements including respective planar elements each with a toothed periphery and respective planar elements each with an annular periphery, and removably securing the planar elements in predetermined alignment about a common rotatable axis, such that the respective planar elements each with an annular periphery respectively form cutting blade receiving annular slots in the wheel assembly generally perpendicular to the common rotatable axis, and such that the respective planar elements each with a toothed periphery collectively form a plurality of circumferentially spaced poultry wing receiving troughs generally parallel to the common rotatable axis. With such methodology, respective of the planar elements may be replaced as damage or wear occurs to such elements. For example, such method may further include optionally the step of removing planar elements having damage or wear thereto and replacing only such planar elements with new like elements, and optionally yet further include mounting one of the planar elements on a rotatable drive shaft of a poultry wing cutting machine in a positive drive coupled arrangement, and thereafter removably securing the remainder of the planar elements to such one planar element.

Those of ordinary skill in the art will better appreciate the features and aspects of such embodiments, methods, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended Figures, in which.

Figure 1:
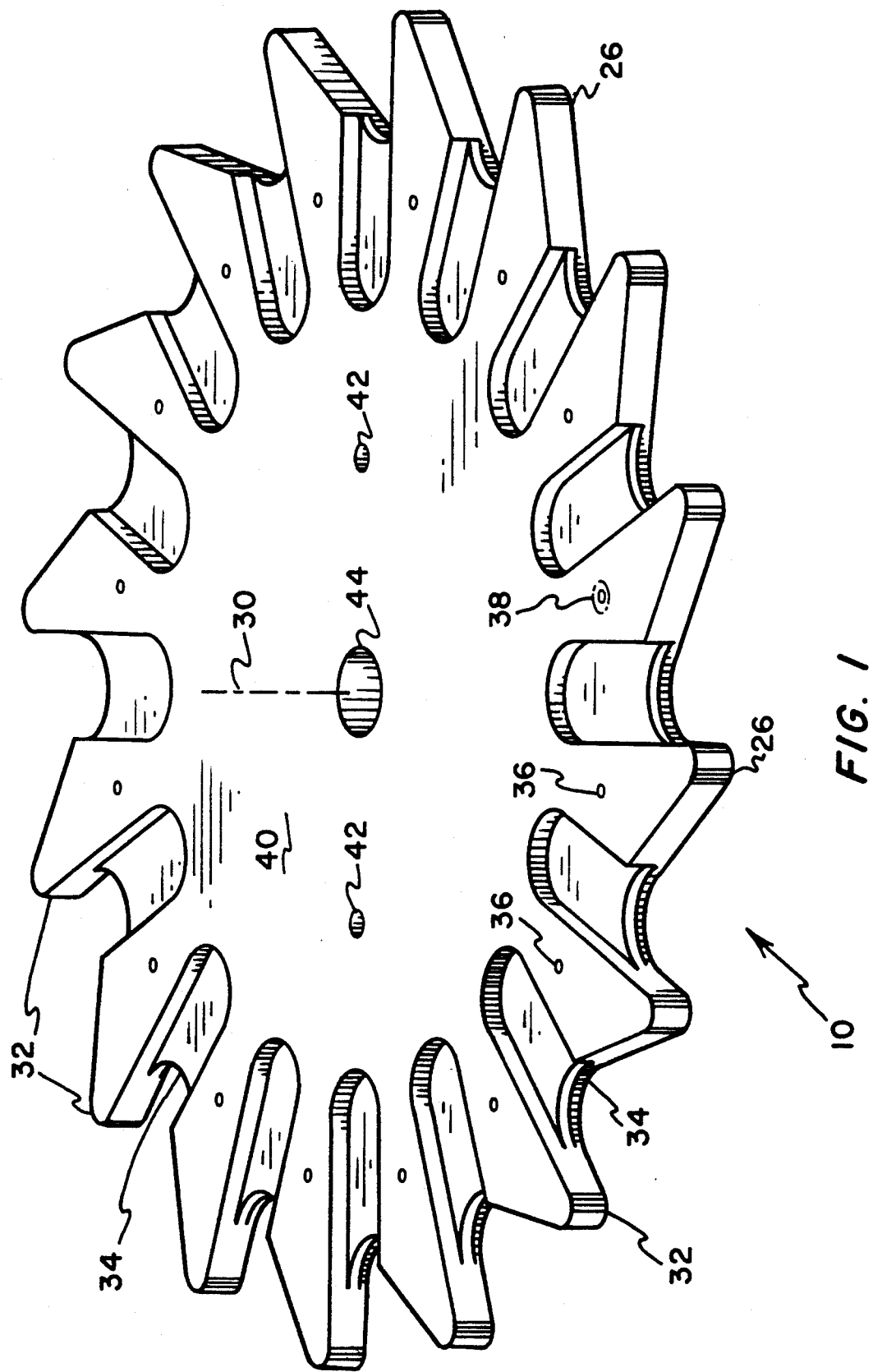
FIG. 1 is a perspective view of an exemplary embodiment of a first wheel segment (or one of a pair of axially outside segments) comprising part of an exemplary multipiece replacement poultry wing receiving wheel or repairable wheel assembly or device in accordance with the invention.

Repeat use of reference characters throughout the present specification and appended drawings is intended to represent same or analogous features, elements, or steps of the invention.

DETAILED DESCRIPTION OF THE PREFERRED EMBODIMENTS

The disclosures of Gasbarro (U.S. Patent No. 4,207,653) and Hazenbroek (U.S. Patent No. 4,577,368) incorporated herein by reference as to all information contained therein.

Referring collectively to present FIGS. 1 through 5, an exemplary present repairable wheel assembly or multipiece replacement poultry wing receiving wheel is illustrated. In the present exemplary embodiment, a total of three removably securable wheel segments are provided, two of which preferably include or carry annular bosses which (when the segments are assembled) respectively define annular slots for operative interaction with and receipt of cutting blades or guide members of a conventional wing cutting apparatus.

Figure 2:
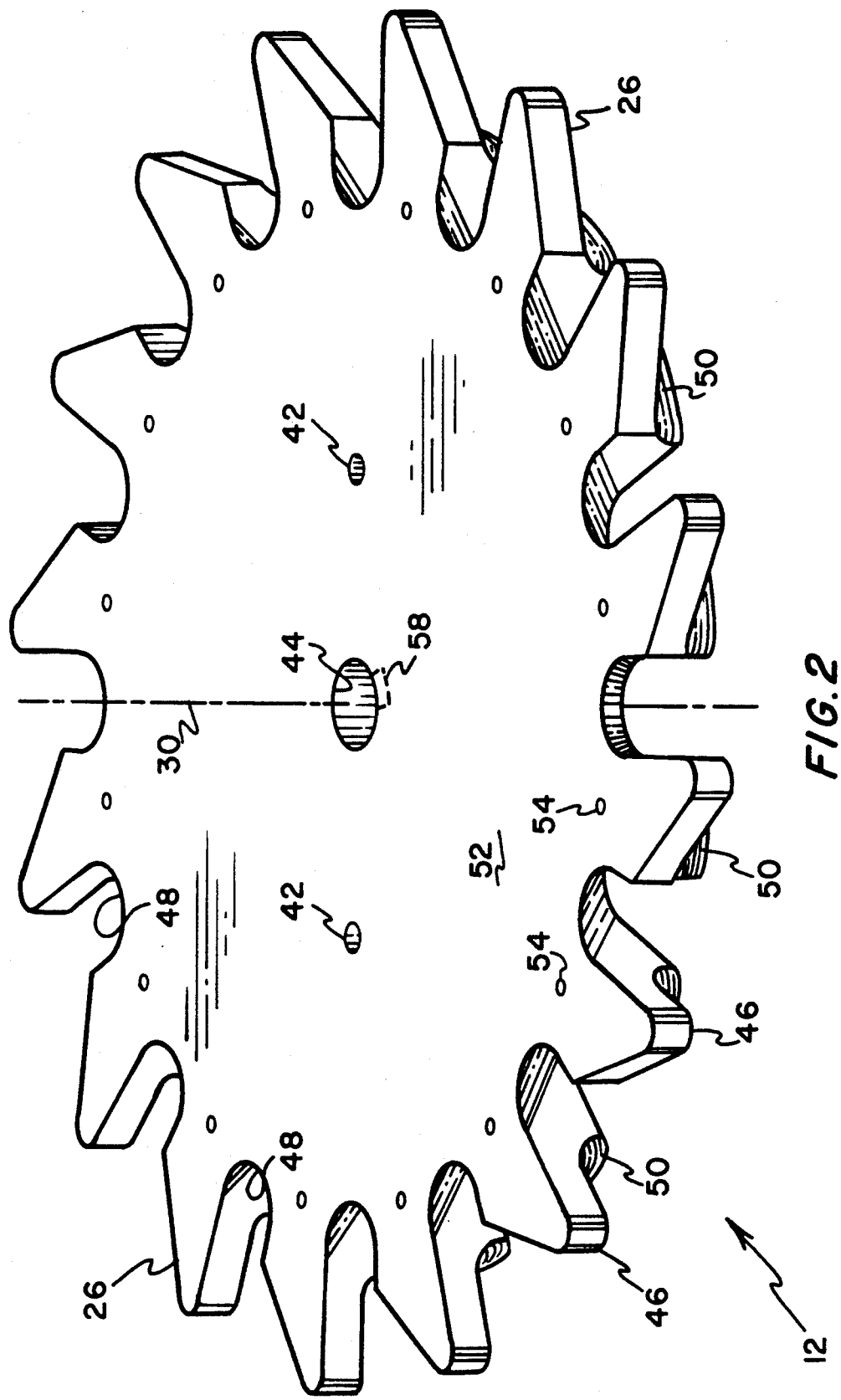
FIG. 2 is a perspective view of an exemplary embodiment of a second wheel segment (or middle segment) comprising part of an exemplary multipiece replacement poultry wing receiving wheel or repairable wheel assembly or device in accordance with the invention.
Figure 3:
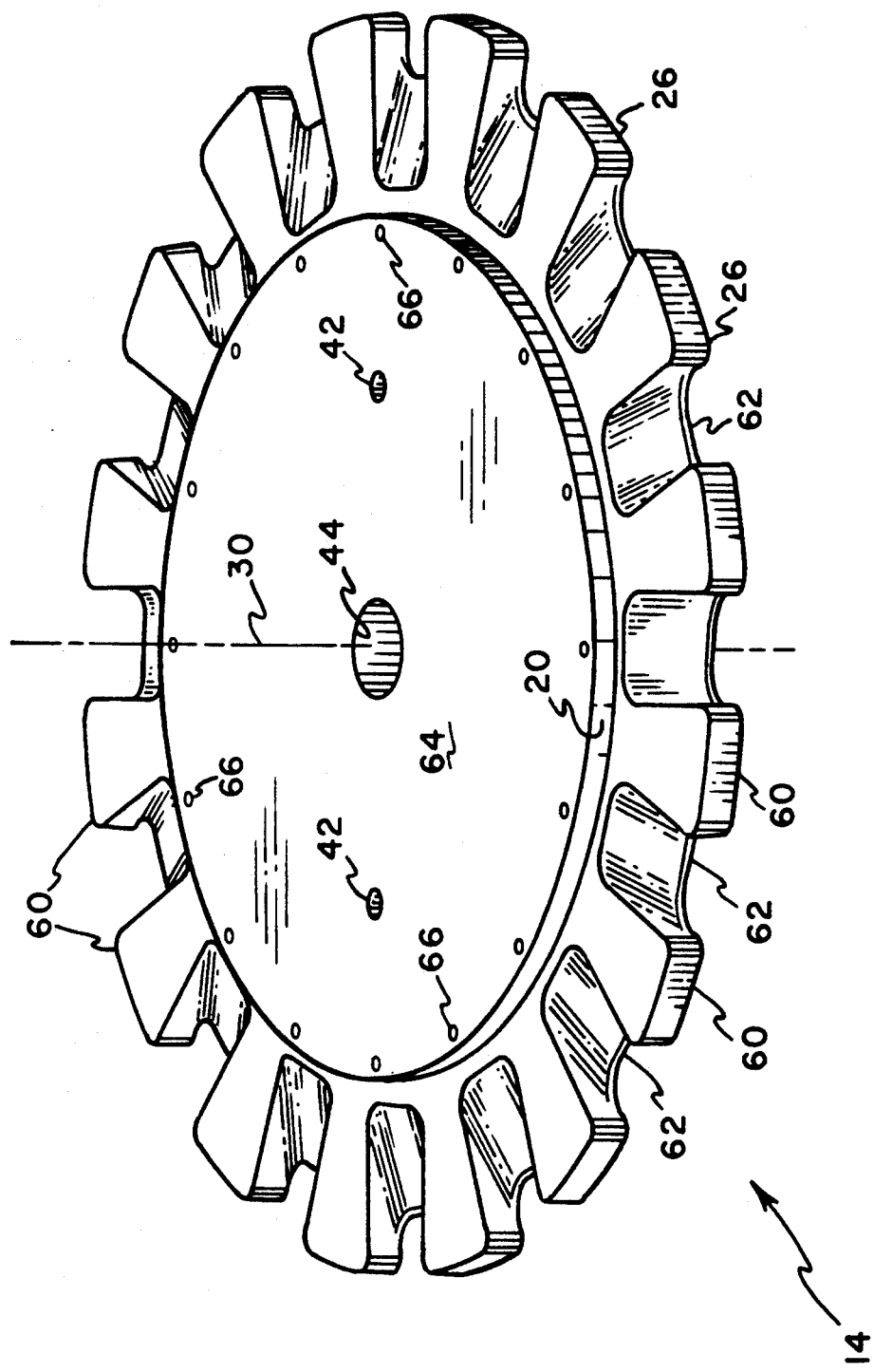
FIG. 3 is a perspective view of an exemplary embodiment of a third wheel segment (or one of a pair of axially outside segments) comprising part of an exemplary multipiece replacement poultry wing receiving wheel or repairable wheel assembly or device in accordance with the invention.

FIG. 1 illustrates an exemplary first wheel segment or respective generally planar element 10 while FIG. 2 illustrates an exemplary second wheel segment or respective generally planar element 12, and further while FIG. 3 illustrates an exemplary third wheel segment or respective generally planar element 14.

Figure 4:
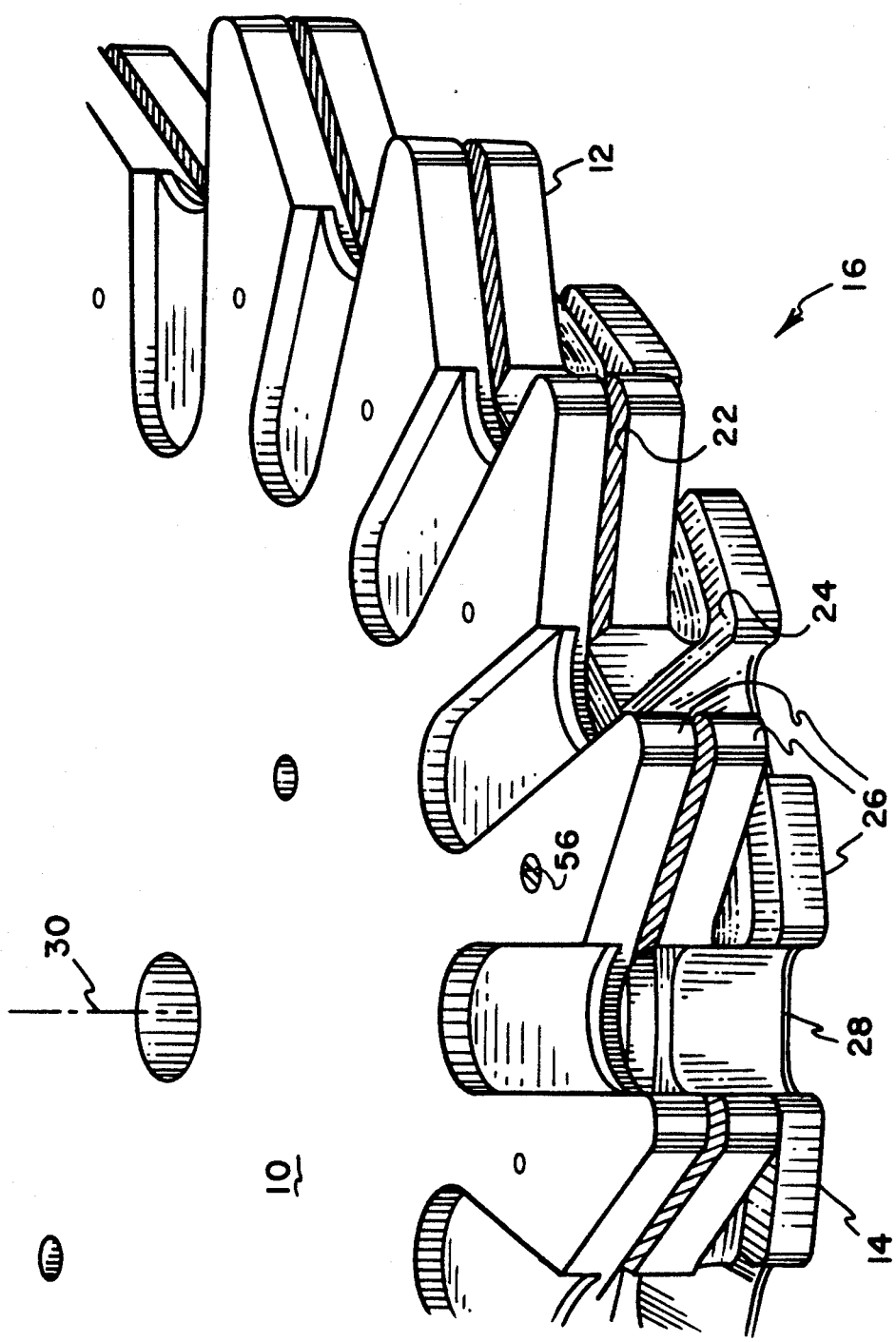
FIG. 4 is an enlarged, partial perspective view of an exemplary repairable wheel assembly or multipiece replacement poultry wing receiving wheel in accordance with the subject invention, which comprises a reversible assembly of the first, second, and third exemplary wheel segments illustrated respectively in present FIGS. 1, 2, and 3.

FIG. 4 illustrates an enlarged perspective partial view with the preferred configuration of such wheel segments 10, 12, and 14 when assembled so as to form a repairable wheel assembly or multipiece replacement poultry wing receiving wheel 16 in accordance with the present apparatus and method. As represented by such FIG. 4, as well as by the exploded sectional view of present FIG. 5, wheel segment 12 generally comprises a central most or middle wheel segment while wheel segments 10 and 14 are axially outward therefrom, i.e., on opposite axial sides of such central most segment 12.

Annular slot features and wing receiving trough features as shown for example in Gasbarro and Hazenbroek, fully incorporated by reference hereinabove, may likewise be provided by the present invention. For example, first wheel segment 10 may be provided with a first annular boss 18 of predetermined thickness while third wheel segment 14 is provided with a second annular boss 20 of another predetermined thickness. See also present FIG. 3. Once the wheel segments are assembled in accordance with the subject invention, respective first and second annular slots 22 and 24 are formed in the wheel assembly 16 (see present FIG. 4) for receiving cutting blades or guide members or the like from a conventional poultry wing cutting apparatus, similar to the first and second annular slots 28 and 30 of the Hazenbroek apparatus.

The present Figures illustrate a presently preferred exemplary embodiment wherein such annular bosses 18 and 20 are integrally formed with respective wheel segments and supported on such axially outward wheel segments so as to be turned inwardly towards the central most wheel segment 12. Alternatively, embodiments of the subject invention may be provided in which one or both of such annular bosses are either entirely separate from the other three illustrated wheel segments and otherwise fixedly secured thereto at the proper time, or one or more of such annular bosses may be carried on central most wheel segment 12. Those of ordinary skill in the art will also understand and appreciate that such annular bosses 18 and 20 likewise define relative trough ridges and trough valleys, respectively, in the plurality of lateral poultry wing receiving troughs which are circumferentially defined about the periphery of the wheel assembly 16. See also, exemplary FIG. 3 and corresponding discussion thereof as referred to in Hazenbroek.

Each of the respective wheel segments 10, 12, and 14 is provided with a toothed periphery. In other words, a plurality of teeth 26 (or projections) are circumferentially spaced about the periphery of each wheel segment as illustrated. It is preferred that the teeth repeat in a predetermined respective pattern for each wheel segment about the entire periphery thereof.

In FIG. 4, it is illustrated how such teeth when circumferentially aligned (in connection with axial alignment and securement of the wheel segments) collectively form a plurality of circumferentially spaced poultry wing receiving troughs 28 about the wheel assembly and generally parallel to a common rotatable axis 30 thereof. The dotted and solid line representations of such axis 30 in the various present Figures are also intended to represent a common drive shaft for the respective wheel segments by which such segments may be operatively associated with a conventional poultry wing cutting apparatus.

As more particularly illustrated in present FIG. 1 with respect to the teeth 26 of first wheel segment 10, it is illustrated in detail that the periphery of such wheel segment alternates between teeth 32 and recesses 34. Generally associated with each tooth or projection 32 is a bore hole 36 which is preferably unthreaded and extends through the entire wheel segment 10 from one axial side thereof to the other. The purpose of such holes will be discussed in greater detail below with reference to reversible wheel assembly means for reversibly securing the respective wheel segments together. If desired, each such hole 36 may be provided with a countersink region 38 so as to limit or minimize the degree of projection of bolt heads or the like from axial side 40 of first wheel segment 10.

If desired, each wheel segment may also be provided with additional holes such as 42 for facilitating wheel segment fabrication (by having some means of securing the wheel segment to a workbench or the like). Such openings 42 may also be used if desired for alignment purposes when assembling the respective wheel segments.

Lastly, wheel segment 10 is provided with a central bore 44 through which preferably is received a poultry wing receiving wheel drive shaft of a conventional poultry wing cutting apparatus, as discussed in greater detail hereinbelow. The annular slots described above (within which cutting blades and guide member or the like are received) are generally perpendicular to the drive shaft as it is received in such central bore 44.

FIG. 2 illustrates the preferred predetermined shape of circumferentially spaced second wheel segment teeth 46 and recesses 48 formed between each of such teeth or projections 46. A relatively reduced diameter portion 50 of teeth 46 will be discussed hereinbelow with reference to FIG. 5. The specific shape of alternate teeth and recesses 46 and 48 as circumferentially disposed about the periphery of wheel segment 12 should be readily apparent to those of ordinary skill in art without further discussion.

The perspective view of FIG. 2 illustrates a single axial side 52 of wheel segment 12. Such axial side 52 is preferably flat so as to be received against the axial side of wheel segment 10 which is opposite side 40 thereof as illustrated in FIG. 1. Such opposite side of wheel segment 10 preferably carries thereon the annular boss 18 as already discussed.

Axial side 52 of wheel segment 12 includes formed therein a plurality of preferably threaded bolt holes 54 which are positioned for selective alignment with bolt holes 36 of wheel segment 10. When so aligned, for example as illustrated in present FIG. 4, mounting means such as including a threaded bolt 56 may be inserted through bolt holes 36 from axial side 40 of wheel segment 10 towards the central most or axially inward wheel segment 12 (specifically, towards side 52 thereof). Once so situated and received, such bolts may be threadably and removably received in threaded bolt holes 54 so that wheel segment 10 is fixedly secured in both axial and circumferential respects relative wheel segment 12. An exemplary bolt head of a bolt 56 is illustrated in present FIG. 4, but those of ordinary skill in the art will completely understand the details of threaded bolt technology and their equivalents without further discussion thereof. It should be noted that stainless steel bolts are preferred so as to facilitate use of the subject invention in operations involving food processing, specifically poultry processing.

As further represented in present FIG. 2, additional holes 42 may likewise be provided in wheel segment 12 to facilitate manufacture and alignment thereof. A central bore 44 also matches that as illustrated in FIG. 1. However, such central bore portion of central most wheel segment 12 may, if desired, also be provided with an integral keyway or the like 58 for establishing a positive drive coupling between wheel segment 12 and a rotating drive shaft of a conventional poultry wing cutting apparatus, such drive shaft having a corresponding key, as understood by those of ordinary skill in the art. For mounting the present apparatus to such a conventional machine in accordance with the present invention, wheel segment 12 may in fact be first situated on such drive shaft, and any other wheel segments comprising a given embodiment of the wheel assembly thereafter otherwise fixedly secured or otherwise engaged with such positively drive coupled wheel segment. In all embodiments, it is preferred that such securement be reversible in some form or manner so as to facilitate removal and replacement of one or more of the respective wheel segments (i.e., repair of the wheel assembly) should any damage or wear occur thereto, without requiring replacement of the entire wheel assembly.

Lastly, the exemplary teeth or projections 60 of present FIG. 3 include recesses 62 therebetween. Formed on axial side 64 of wheel segment 14 is a plurality of preferably nonthreaded bolt holes 66 which are situated for correspondence and ultimate alignment with a plurality of corresponding preferably threaded bolt holes 68 (see FIG. 5) received on axial side 70 of wheel segment 12 opposite axial side 52 thereof. A separate set of threaded bolts or the like may be used to removably secure axially outward wheel segment 14 to centralmost wheel segment 12. Again, through holes 42 may be provided to facilitate manufacture and alignment of wheel segment 14, and a drive shaft may be received in a central bore 44 thereof.

Further aspects of the subject invention are discussed hereinafter primarily with reference to present FIG. 5, which illustrates in side cross-sectional view an exploded repairable wheel assembly or multipiece replacement poultry wing receiving wheel 16 in accordance with the subject invention. While FIG. 5 specifically illustrates by way of example three separable wheel segments which may be utilized in accordance with the invention, those of ordinary skill in the art will appreciate that annular bosses 18 and 20 may be viewed as comprising a respective planar element with an annular periphery, which may be formed separately from the respective wheel segments 10 and 14. In such an embodiment, as represented by present FIG. 5, wheel segments 10 (without boss 18), 12, and 14 (without boss 20) would comprise generally planar elements each with toothed periphery, while separate members 18 and 20 would comprise generally planar elements with an annular periphery. Further, as illustrated, such respective planar elements are in mutual axial alignment and axially displaced from one another, with the respective planar elements with an annular periphery (members 18 and 20) each axially and respectively interposed between adjacent of the toothed elements, so that a total of five planar elements are axially aligned, alternately toothed and annular. In other words, planar element 18 with an annular periphery is between respective adjacent planar elements 10 and 12 each having a toothed periphery, while annular boss 20 comprises a planar element with an annular periphery and interposed between adjacent toothed elements 12 and 14. In such instance, separate holes may be provided in members 18 and 20 for correspondence with bolt holes 36 and 66, for removable securement of the respective wheel segments as discussed above.

As illustrated, the respective threaded bolts 56 are inserted axially inward, i.e., in the direction of arrows 72 and 74. As the bolts are drawn into the corresponding plurality of threaded bolt holes 54 and 68 on each axial side 52 and 70 of wheel segment 12, the preferred offset alignment of the respective sets of such bolt holes prevents any interference from one axial side to another.

Figure 5:
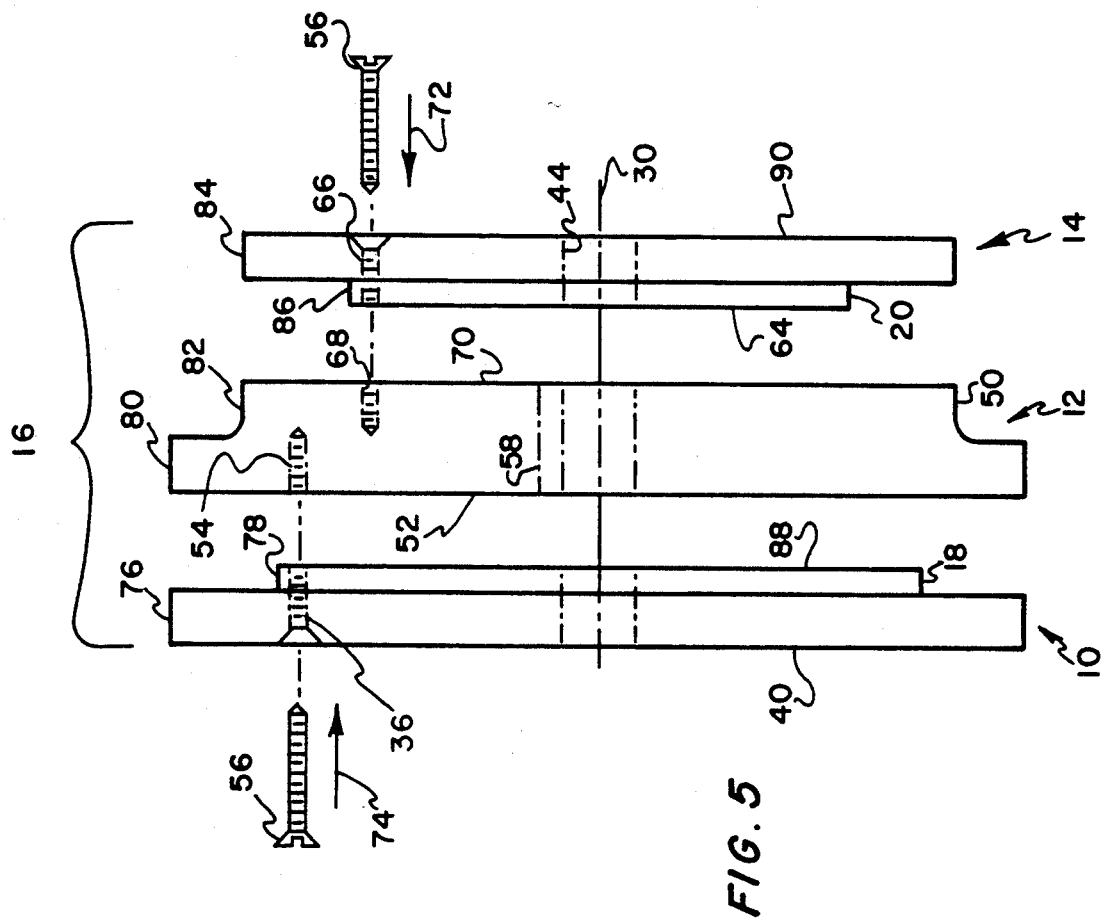
FIG. 5 is an exploded, sectional view of three exemplary wheel segments which may be assembled in accordance with the present invention so as to form a repairable wheel assembly or multipiece replacement wheel in accordance with this invention.

As further represented in present FIG. 5, first wheel segment 10 may be viewed as having one annular region with a first outside diameter 76 and comprised of circumferentially spaced first wheel teeth 32 of predetermined shape as illustrated in present FIG. 1 and situated about the periphery of such first wheel segment 10, and another annular region comprising a first annular boss 18 of predetermined thickness and of a second outside diameter 78 smaller than that of first outside diameter 76. Second wheel segment 12 may have an annular region with an outside diameter 80 matching that of the first outside diameter 76. Such outside diameter includes circumferentially spaced second wheel segment teeth 46 of a predetermined shape as illustrated in present FIG. 2 and situated about the periphery of such second wheel segment 12. Such teeth as illustrated are reduced (in area 50 thereof) on one axial side 70 of the second wheel segment 12 to a third outside diameter 8 which is less than that of the outside diameter 76 but greater than that of the second outside diameter 78.

The third exemplary wheel segment 14 has one annular region with an outside diameter 84 matching that of the third outside diameter 82 and comprised of circumferentially spaced third wheel segment teeth 60 of predetermined shape as illustrated in present FIG. 3 and situated about the periphery of such third wheel segment 14. Such wheel segment 14 includes another annular region comprising a second annular boss 20 of predetermined thickness and of a fourth outside diameter 86 smaller than that of said second outside diameter 78.

Reversible wheel assembly means such as the threaded bolts 56 and corresponding associated bolt holes as described above, may be provided for reversibly securing respective wheel segments together in fixed axial and circumferential alignment. Such bolts are generally inserted in the direction of arrows 74 and 72 parallel to a common rotatable axis 30. As understood by those of ordinary skill in the art, the predetermined thickness of respective annular bosses 18 and 20 likewise define first and second annular slots in the multipiece replacement wheel 16. Also, the differing outside diameters 78 and 86 of bosses 18 and 20 respectively define different depth of such first and second annular slots 22 and 24 (see FIG. 4), which preferably correspond with poultry wing receiving lateral trough ridges and valleys, respectively, as discussed above.

When practicing the present method, as is generally referenced above, central or second wheel segment 12 may be mounted to a rotatable drive shaft of a conventional poultry wing cutting apparatus having a correspondingly keyed drive shaft for a poultry wing receiving wheel. Thereafter, preferably antibacterial materials are coated (i.e., applied) on mutually adjacent surfaces of wheel segments prior to securement thereof. For instance, axial surfaces 88, 52, 70, and 64 may be coated with an antibacterial material such as RTV silicon. Subsequently, the wheel segments are locked together and reversibly or removably secured, such as with bolts 56 or other equivalent means, as described above. In the event there is any wear or damage to any of the respective teeth or recesses as described above for any of the wheel segments, such reversible securement means may simply be reversed, and the necessary wheel segment replaced with a new like wheel segment, after which the wheel assembly may again be formed for operation. A tremendous savings is thereby effected since the entire former conventional single piece wheel does not have to be replaced. In other words, a wheel assembly in accordance with this invention may be (to the extent described above) repairable, instead of having to be totally replaced. Also, because of the relatively thinner sections involved, the initial fabrication of the respective wheel segments is much simpler than the complex fabrication of the one piece style poultry wing receiving wheel. Such is true for a variety of materials which would normally be utilized, such as manmade materials, for example thermoplastics (particularly for example, nylon).

It will be further understood by those of ordinary skill in the art that various numbers of wheel segments may be provided in accordance with the present invention so as to be removably or reversibly secured to one another so as form a wheel assembly in accordance with this invention (both apparatus and method). Accordingly, the present invention is not limited to simply the three piece exemplary embodiment submitted herewith. Similarly, this invention is not limited to specific dimensions, nor specific numbers of lateral troughs or of annular slots, it being understood that those of ordinary skill in the art can (and will) supply such specifics when practicing the subject invention with a specific poultry wing cutting apparatus. In addition, it should be further understood by those of ordinary skill in the art that the foregoing presently preferred embodiment of both apparatus and methodology is exemplary only in all respects, and that the intended description thereof is likewise by way of words of example rather than words of limitation, and their use do not preclude inclusion of such modifications, variations, and/or additions to the present invention which would be readily apparent to those of ordinary skill in the art, the scope of the present invention being set forth in the appended claims.

What is claimed is:

1. A wheel assembly for use with a poultry wing cutting machine in processing wings on a given respective side of such poultry, comprising plural generally planar elements including respective planar elements each with a toothed periphery and respective planar elements each with an annular periphery, and reversible securement means for removably securing said planar elements collectively in predetermined alignment about a common rotatable axis, such that said respective planar elements each with an annular periphery respectively form cutting blade receiving annular slots in said wheel assembly generally perpendicular to said common rotatable axis, and such that said respective planar elements each with a toothed periphery collectively form a plurality of circumferentially spaced poultry wing receiving troughs generally parallel to said common rotatable axis, so that respective of said planar elements may be replaced through operation of said securement means as damage or wear occurs to such elements.

2. A wheel assembly as in claim 1, wherein each of said planar elements with an annular periphery is integrally formed with one of the respective planar elements with a toothed periphery.

3. A wheel assembly as in claim 1, including two of said respective elements with an annular periphery so as to respectively form two of said annular slots axially displaced from one another, and wherein each of said troughs have a predetermined poultry wing receiving profile with a relative trough ridge formed at one of said annular slots and a relative trough valley formed at the other of said annular slots.

4. A wheel assembly as in claim 1, wherein said securement means include removable bolts for removably securing said planar elements to one another.

5. A wheel assembly as in claim 1, wherein said respective planar elements with a toothed periphery include three toothed elements in mutual axial alignment and axially displaced from one another, and said respective planar elements with an annular periphery include two annular elements in mutual axial alignment with said toothed elements and each axially and respectively interposed between adjacent of said toothed elements, so that a total of five planar elements are axially aligned, alternately toothed and annular.

6. A wheel assembly as in claim 5, wherein said annular elements are respectively integrally formed with an adjacent planar toothed element axially outward therefrom.

7. A wheel assembly as in claim 6, wherein said securement means includes a plurality of removable bolts received on each axial side of said wheel assembly and extending generally axially inward from the axially outward planar members to the central most planar member, so as to commonly secure such axially outward members to such central most member.

8. A wheel assembly as in claim 7, wherein said plurality of bolts on respective axial sides of said wheel assembly are aligned in respective axial patterns offset from one axial side to another so as to avoid interference among bolts from opposite axial sides of said wheel assembly.

9. A wheel assembly as in claim 7, wherein said central most planar member includes an integral keyway defined in a central bore thereof for drive coupling of such member with a drive shaft.

10. A wheel assembly as in claim 1, further including antibacterial coatings on said planar elements applied to mutually adjacent surfaces thereof.

11. A multipiece, repairable rotatable wheel device for use with an apparatus having cutting blades and guide members and used for cutting apart poultry wings on a given respective side of such poultry, said wheel device including a plurality of respective wheel segments assembled about a common drive axis to form said wheel device, with at least first and second recessed annular regions formed thereby so as to define respective first and second annular slots in said assembled wheel device for receipt of apparatus cutting blades and guide members therein, and with a plurality of teeth elements of predetermined shape formed about the periphery of each of said respective wheel segments, said segments being collectively rotatable about said common drive axis thereof in fixed relative alignment such that said teeth form a plurality of circumferentially spaced lateral troughs for respectively receiving poultry wings therein from a given respective side of poultry being processed to be cut apart with apparatus cutting blades received in one or more of said annular slots, and wherein said wheel segments are separably assembled so that respective wheel segments of an assembled wheel device may be replaced as features thereof become worn or broken, without requiring replacement of the entire assembled wheel device.

12. A rotatable wheel device as in claim 11, wherein said plurality of wheel segments comprises three wheel segments and wherein said annular regions are defined by respective annular bosses carried on respective axially outward of said three segments.

13. A rotatable wheel device as in claim 12, wherein the middle of said three wheel segments includes threaded bolt holes formed in each axial side thereof, and into which are received threaded bolts for securing another of said three wheel segments on each respective axial side of such middle wheel segment.

14. A rotatable wheel device as in claim 11, further including removable bolts for separably assembling said wheel segments.

15. A rotatable wheel device as in claim 11, wherein said first annular region has a larger outside diameter than that of said second annular region, and wherein said first annular region defines a relative ridge in each of said plurality of lateral troughs while said second annular region defines a relative valley in each of said plurality of lateral troughs.

16. A multipiece replacement poultry wing receiving wheel for a poultry wing cutting apparatus having cutting blades and guide bars, said multipiece replacement wheel comprising:
- a first wheel segment having one annular region with a first outside diameter and comprised of circumferentially spaced first wheel segment teeth of predetermined shape situated about the periphery of said first wheel segment, and another annular region comprising a first annular boss of predetermined thickness and of a second outside diameter smaller than that of said first outside diameter;
- a second wheel segment having an annular region with an outside diameter matching that of said first outside diameter, and including circumferentially spaced second wheel segment teeth of predetermined shape situated about the periphery of said second wheel segment, said teeth being reduced on one axial side of said second wheel segment to a third outside diameter less than that of said first outside diameter but greater than that of said second outside diameter;
- a third wheel segment having one annular region with an outside diameter matching that of said third outside diameter and comprised of circumferentially spaced third wheel segment teeth of predetermined shape situated about the periphery of said third wheel segment, and another annular region comprising a second annular boss of predetermined thickness and of a fourth outside diameter smaller than that of said second outside diameter; and
- reversible wheel assembly means for reversibly securing said first, second, and third wheel segments together in fixed axial and circumferential alignment about a common rotatable axis, such that said first and second annular bosses define respective first and second annular slots of different depths in said multipiece replacement wheel for receiving cutting blades and guide bars of a poultry wing cutting apparatus, and such that the respective teeth of said wheel segments are aligned for forming a plurality of circumferentially spaced lateral troughs therebetween for receiving poultry wings to be cut, while said respective wheel segments are individually replaceable when damaged or worn without requiring replacement of the entire wheel.

17. A multipiece replacement wheel as in claim 16, wherein said reversible wheel assembly means includes mounting means for mounting said first and third wheel segments respectively to opposite axial sides of said second wheel segment therebetween.

18. A multipiece replacement wheel as in claim 17, wherein said mounting means includes threaded bolt holes formed in said second wheel segment on respective axial sides thereof, unthreaded bolt holes formed through said first and third wheel segments respectively, and a plurality of threaded bolts for securement of said first and third wheel segments respectively to said second wheel segment.

19. A multipiece replacement wheel as in claim 16, wherein said wheel segments comprise thermoplastic materials.

20. A multipiece replacement wheel as in claim 16, wherein said second wheel segment includes a central bore having an integral keyway for cooperative interaction with a correspondingly keyed drive shaft, and said wheel includes coatings of antibacterial materials between adjacent surfaces of said wheel segments.

21. A method of forming a wheel assembly for use with a poultry wing cutting machine in processing wings on a given respective side of such poultry, comprising providing plural generally planar elements including respective planar elements each with a toothed periphery and respective planar elements each with an annular periphery, and removably securing said planar elements collectively in predetermined alignment about a common rotatable axis, such that said respective planar elements each with an annular periphery respectively form cutting blade receiving annular slots in said wheel assembly generally perpendicular to said common rotatable axis, and such that said respective planar elements each with a toothed periphery collectively form a plurality of circumferentially spaced poultry wing receiving troughs generally parallel to said common rotatable axis, so that respective of said planar elements may be replaced as damage or wear occurs to such elements.

22. A method of forming a wheel assembly as in claim 21, further including integrally forming with each of said planar elements having an annular periphery a planar element having a toothed periphery.

23. A method of forming a wheel assembly as in claim 21, wherein said providing includes forming two of said respective elements with an annular periphery so as to respectively form two of said annular slots axially displaced from one another, and wherein said method further includes forming each of said troughs with a predetermined poultry wing receiving profile having a relative trough ridge formed at one of said annular slots and a relative trough valley formed at the other of said annular slots.

24. A method of forming a wheel assembly as in claim 21, wherein said securing includes using removable bolts for removably securing said planar elements to one another.

25. A method of forming a wheel assembly as in claim 21, wherein providing said respective planar elements with a toothed periphery includes providing three toothed elements in mutual axial alignment and axially displaced from one another, and wherein providing said respective planar elements with an annular periphery includes providing two annular elements in mutual axial alignment with said toothed elements and each axially and respectively interposed between adjacent of said toothed elements, so that a total of five planar elements are axially aligned, alternately toothed and annular.

26. A method of forming a wheel assembly as in claim 25, wherein providing said annular elements includes respectively integrally forming such with an adjacent planar toothed element axially outward therefrom.

27. A method of forming a wheel assembly as in claim 26, wherein said securing includes inserting a plurality of removable bolts into each axial side of said wheel assembly and extending generally axially inward from the axially outward planar members to the central most planar member, so as to commonly secure such axially outward members to such central most member.

28. A method of forming a wheel assembly as in claim 27, wherein said plurality of bolts on respective axial sides of said wheel assembly are aligned in respective axial patterns offset from one axial side to another so as to avoid interference among bolts from opposite axial sides of said wheel assembly.

29. A method of forming a wheel assembly as in claim 27, further including providing said central most planar member with an integral keyway defined in a central bore thereof for drive coupling of such member with a drive shaft.

30. A method of forming a wheel assembly as in claim 21, further including applying antibacterial coatings on mutually adjacent surfaces of said planar elements.

31. A method of forming a wheel assembly as in claim 21, further including removing planar elements having damage or wear thereto and replacing only such planar elements with new like elements.

32. A method of forming a wheel assembly as in claim 21, further including mounting one of said planar elements on a rotatable drive shaft of a poultry wing cutting machine in a positive drive coupled arrangement, and thereafter removably securing the remainder of said planar elements to such one planar element.

33. A method of providing a multipiece replacement poultry wing receiving wheel for a poultry wing cutting apparatus having cutting blades and guide bars, said method comprising:
  providing a first wheel segment having one annular region with a first outside diameter and comprised of circumferentially spaced first wheel segment teeth of predetermined shape situated about the periphery of said first wheel segment, and another annular region comprising a first annular boss of predetermined thickness and of a second outside diameter smaller than that of said first outside diameter;
  providing a second wheel segment having an annular region with an outside diameter matching that of said first outside diameter, and including circumferentially spaced second wheel segment teeth of predetermined shape situated about the periphery of said second wheel segment, said teeth being reduced on one axial side of said second wheel segment to a third outside diameter less than that of said first outside diameter but greater than that of said second outside diameter;
  providing a third wheel segment having one annular region with an outside diameter matching that of said third outside diameter and comprised of circumferentially spaced third wheel segment teeth of predetermined shape situated about the periphery of said third wheel segment, and another annular region comprising a second annular boss of predetermined thickness and of a fourth outside diameter smaller than that of said second outside diameter; and
  reversibly securing said first, second, and third wheel segments together in fixed axial and circumferential alignment about a common rotatable axis, such that said first and second annular bosses define respective first and second annular slots of different depths in said multipiece replacement wheel for receiving cutting blades and guide bars of a poultry wing cutting apparatus, and such that the respective teeth of said wheel segments are aligned for forming a plurality of circumferentially spaced lateral troughs therebetween for receiving poultry wings to be cut, while said respective wheel segments are individually replaceable when damaged or worn without requiring replacement of the entire wheel.

34. A method of providing a multipiece replacement wheel as in claim 33, wherein said reversibly securing step includes providing mounting means for mounting said first and third wheel segments respectively to opposite axial sides of said second wheel segment therebetween.

35. A method of providing a multipiece replacement wheel as in claim 34, wherein said mounting means includes threaded bolt holes formed in said second wheel segment on respective axial sides thereof, unthreaded bolt holes formed through said first and third wheel segments respectively, and a plurality of threaded bolts for securement of said first and third wheel segments respectively to said second wheel segment.

36. A method of providing a multipiece replacement wheel as in claim 33, wherein said wheel segments comprise thermoplastic materials.

37. A method of providing a multipiece replacement wheel as in claim 33, wherein said method further includes removing and replacing any respective wheel segment having damage or wear thereto.

38. A method of providing a multipiece replacement wheel as in claim 33., wherein providing said second wheel segment includes forming therein a central bore having an integral keyway for cooperative interaction with a correspondingly keyed drive shaft, and said method further includes providing said wheel with coatings of antibacterial materials between adjacent surfaces of said wheel segments prior to securing thereof together.

39. A method of providing a multipiece replacement wheel as in claim 38, further including mounting said second wheel segment on a rotatable drive shaft of a poultry wing cutting apparatus having a keyed drive shaft for a poultry wing receiving wheel, and subsequently securing said first and third wheel segments to said second wheel segment on respective axial sides thereof.

* * * * *